(12) United States Patent
Lee

(10) Patent No.: US 6,401,146 B1
(45) Date of Patent: Jun. 4, 2002

(54) DEVICE AND METHOD FOR CONTROLLING PCI ETHERNET

(75) Inventor: Gye Hun Lee, Seoul (KR)

(73) Assignee: LG Semicon Co., Ltd., Chungcheongbuk-do (KR)

( * ) Notice: Subject to any disclaimer, the term of this patent is extended or adjusted under 35 U.S.C. 154(b) by 0 days.

(21) Appl. No.: 09/138,554

(22) Filed: Aug. 24, 1998

(30) Foreign Application Priority Data

Feb. 6, 1998 (KR) ................................................ 98/3429

(51) Int. Cl.[7] ................................................ G06F 13/14
(52) U.S. Cl. .......................................... 710/53; 709/236
(58) Field of Search ................................ 709/310–332, 709/250, 200–253; 711/1–221; 710/22, 56, 52, 53; 370/413

(56) References Cited

U.S. PATENT DOCUMENTS

| | | | |
|---|---|---|---|
| 5,341,476 A | * | 8/1994 | Lowell ........................ 709/219 |
| 5,412,782 A | | 5/1995 | Hausman et al. ............ 709/250 |
| 5,485,584 A | * | 1/1996 | Hausman et al. .............. 710/22 |
| 5,617,541 A | * | 4/1997 | Albanese et al. ............ 709/207 |
| 5,771,356 A | * | 6/1998 | Leger et al. ................. 709/233 |
| 5,784,649 A | * | 7/1998 | Begur et al. ................... 710/52 |
| 5,859,980 A | * | 1/1999 | Kalkunte ..................... 709/232 |
| 5,872,920 A | * | 2/1999 | Hausman et al. ........... 709/250 |
| 6,047,339 A | * | 4/2000 | Su et al. ........................ 710/56 |
| 6,055,589 A | * | 4/2000 | Kawamura et al. ........... 710/52 |
| 6,067,300 A | * | 5/2000 | Baumert et al. ............. 370/413 |
| 6,094,692 A | * | 7/2000 | Kalkunte ...................... 710/34 |
| 6,112,252 A | * | 8/2000 | Hausman et al. ........... 709/250 |
| 6,138,189 A | * | 10/2000 | Kalkunte ..................... 710/53 |

* cited by examiner

*Primary Examiner*—St. John Courtenay, III
(74) *Attorney, Agent, or Firm*—Birch, Stewart, Kolasch & Birch, LLP

(57) ABSTRACT

Device and method for controlling a PCI ethernet in data transmission between a host computer and various media, is disclosed, the method including the steps of (1) storing data to be transmitted in a memory in succession until an amount of the data becomes greater than a threshold value when the data is transmitted in succession, (2) keeping the data stored in the memory as they are and storing data in the memory again starting from data which is not stored in the memory yet if an underrun occurs in the middle of data transmission and storing data in the memory again from beginning of the data if an error other than the underrun is occurred, and (3) determining completion of transmission of one full packet of data if no error is occurred, whereby shortening a time period required for transmission of data from a host computer to various media.

13 Claims, 5 Drawing Sheets

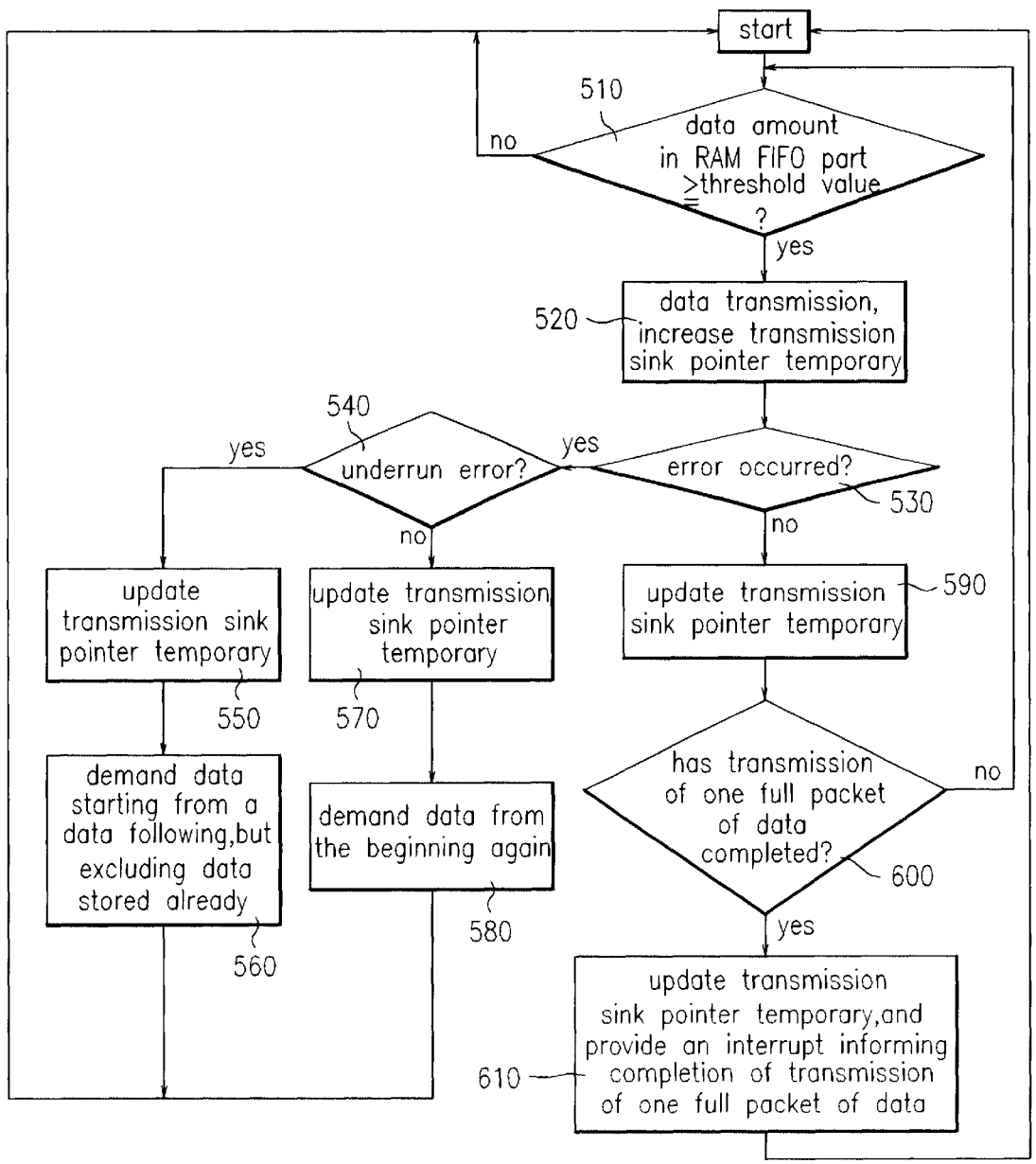

DEVICE AND METHOD FOR CONTROLLING PCI ETHERNET

BACKGROUND OF THE INVENTION

1. Field of the Invention

The present invention relates to a PCI, and more particularly, to device and method for controlling a PCI ethernet which is adapted to keep already received data in place when priority is shifted to some other device in the middle of data reception, and continuing reception of the data starting from data following the received data when the priority comes back, for minimizing a time period required for data transmission.

2. Discussion of the Related Art

A related art device and method for controlling a PCI ethernet will be explained with reference to the attached drawings. FIG. 1 illustrates a block diagram of a background art adapter for use in data communications between a host computer and various media.

Referring to FIG. 1, the related art adapter 10 is provided with a twist pair network cable 30, a twist pair transceiver part 100, an attachment unit interface part 110, a decoder part 115, an encoder part 120, a receive controlling part 130, a transmit controlling part 140, an ethernet controlling part 150, an FIFO(First In First Out) transmit part 180, an FIFO receive part 160, a receiver side RAM FIFO part 170, transmission side RAM FIFO part 180, and a host interface part 200. The twist pair transceiver part 100 is connected between the attachment unit interface part 110, and decoder part 115 and encoder part 120 in parallel. The decoder part 115 is connected to the receive controlling part 130, and the encoder part 120 is connected to the transmit controlling part 140. The receive controlling part 130 and the transmit controlling part 140 are connected to each other and have the ethernet controlling part 150 in common. The receive controlling part 130 is connected to the FIFO transmit part 180 connected to the transmission side RAM FIFO part 190. The transmit controlling part 180 is connected to the FIFO transmit part 180 connected to the transmission side RAM FIFO part 190. Both the FIFO transmit part 180 and the FIFO receive part 160 are connected to the host interface part 200. The part enclosed by a dotted line, including all the different controlling parts, RAMs, tranceiver parts, is called as an ASIC(Application Specific Integrated Circuit) part 210. The ASIC part 210 has an EEPROM 220 connected to the host interface part 200 providing data locations such as addresses of media or stations, a clock part 240 and a network management part 250 for managing signals according to various network states. The decoder part 115 and the encoder part 120 are connected to a VCO (Voltage Controlled Oscillator) 270. The unexplained reference numeral 230 is a boot PROM.

The operation of the aforementioned background art adapter will be explained with reference to FIG. 2.

In general, all the data transmission between the adapter 10 and the host computer are conducted by a program input/output device PIO. Data transmitted from the host computer is stored in the transmission side FIFO part 420 in the form of 2 word (4 bytes) by the adapter 10. That is, as shown in FIG. 2, transmission data to be transmitted from the host computer to each ethernet computer are stored in the transmission side RAM FIFO part 190 by a driver. In this instance, an amount of data in the transmission side RAM FIFO part 190 and a threshold value are compared(420), to start data transmission(425) if the amount of data is greater than the threshold value even if the data does not compose one perfect packet unit. The data transmission is conducted until one complete packet is transmitted as long as no error occurs. During data transmission, the error detecting part detects any occurrence of error (430), and, if an error occurs, determines if the error is an underrun error (435). And, if the error is determined to be an underrun error, a "bad" CRC is generated (440). In the case when the error is not an underrun error, or the "bad" CRC was generated, a status bit that informs of error occurrence in the middle of data transmission is updated(445), and data transmission is stopped(450). In this instance, as data transmission is stopped on determination of the error being an underrun error, on restarting of data transmission, the FIFO transmit part 180 should request that the host computer transmit the data from the beginning. Accordingly, the host computer transmits data to the transmission side RAM FIFO part 190 as the FIFO transmit part 180 requests. The data transmission is continued as discussed. In the meantime, if the error detecting part detects no error, a transmission status bit is updated (460). Then, whether there has been transmission of one complete packet of data is determined (465). If the one complete packet of data is not transmitted fully, the process proceeds to the first step(420) for transmission of the remaining data required for completion of one complete packet. If the one complete packet of data is transmitted fully, an interrupt communicating this to a driver is provided (470). Thus, data can be transmitted from the host computer to each ethernet computer.

However, the controlling method of the related art PCI ethernet controlling device has the following problems.

On occurrence of an underrun in the middle of data transmission, all the packet data in the transmission side RAM FIFO part up to the present time is abandoned, and data storage in the transmission side RAM FIFO starts from the beginning. Therefore, as the driver requests from the host computer transmission of the data from the beginning, storage of the data in the RAM FIFO part if the data is available, and transmit the data again, a transmission time for transmission of data is delayed accordingly.

SUMMARY OF THE INVENTION

Accordingly, the present invention is directed to a device and method for controlling a PCI ethernet that substantially obviates one or more of the problems due to limitations and disadvantages of the related art.

An object of the present invention is to provide a device and method for controlling a PCI ethernet which can shorten data transmission time.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for controlling a PCI ethernet for transmission of data between a host computer and various media includes a RAM FIFO part for storing data transmitted from the host computer and providing the data in succession when an amount of stored data becomes greater than a transmission threshold value, a first controlling part for controlling data storage in the RAM FIFO part and comparing the amount of stored data to the threshold value for providing a data start signal, and a second controlling part for reading data in succession in response to the data start signal from the first controlling part and updating the position of a temporary sink pointer which marks the amount of data read upon occurrence of an underrun, to a position in the RAM FIFO part at which the data is stored.

In another aspect of the present invention, there is provided a method for controlling a PCI ethernet controlling device for data transmission between a host computer and various media, including the steps of (1) storing data to be transmitted in a memory in succession until an amount of the data becomes greater than a threshold value when the data is transmitted in succession, (2) retaining the data already stored in memory while storing new data in the memory starting from data which is not yet stored in memory if an underrun occurs in the middle of data transmission, and storing data in the memory from beginning of the data if an error other than underrun occurs, and (3) determining completion of transmission of one full packet of data if no error occurs.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

PREFERRED EMBODIMENT

Figure 1:
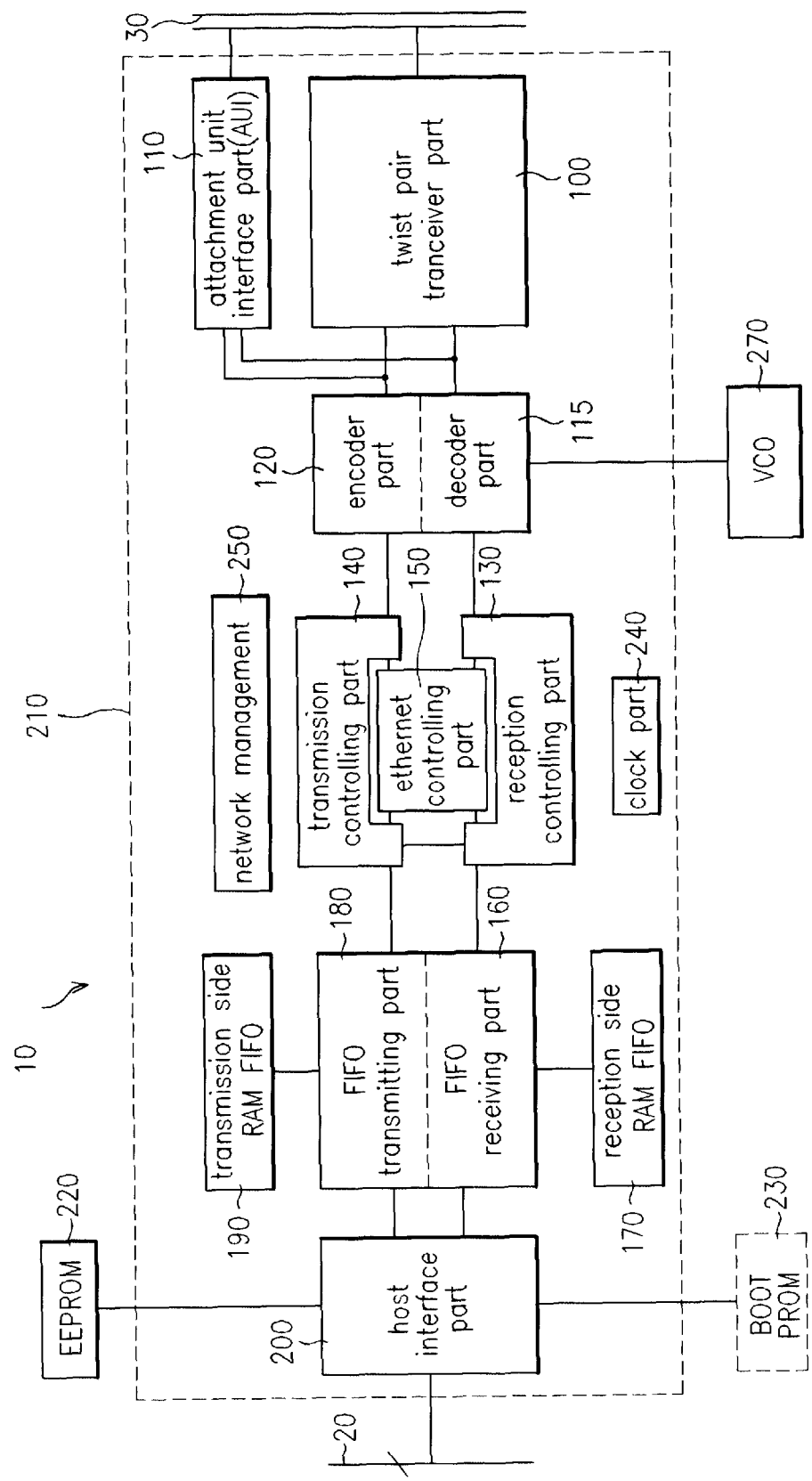
FIG. 1 illustrates a block diagram of a related art adapter for use in data communications between a host computer and various media.
Figure 2:
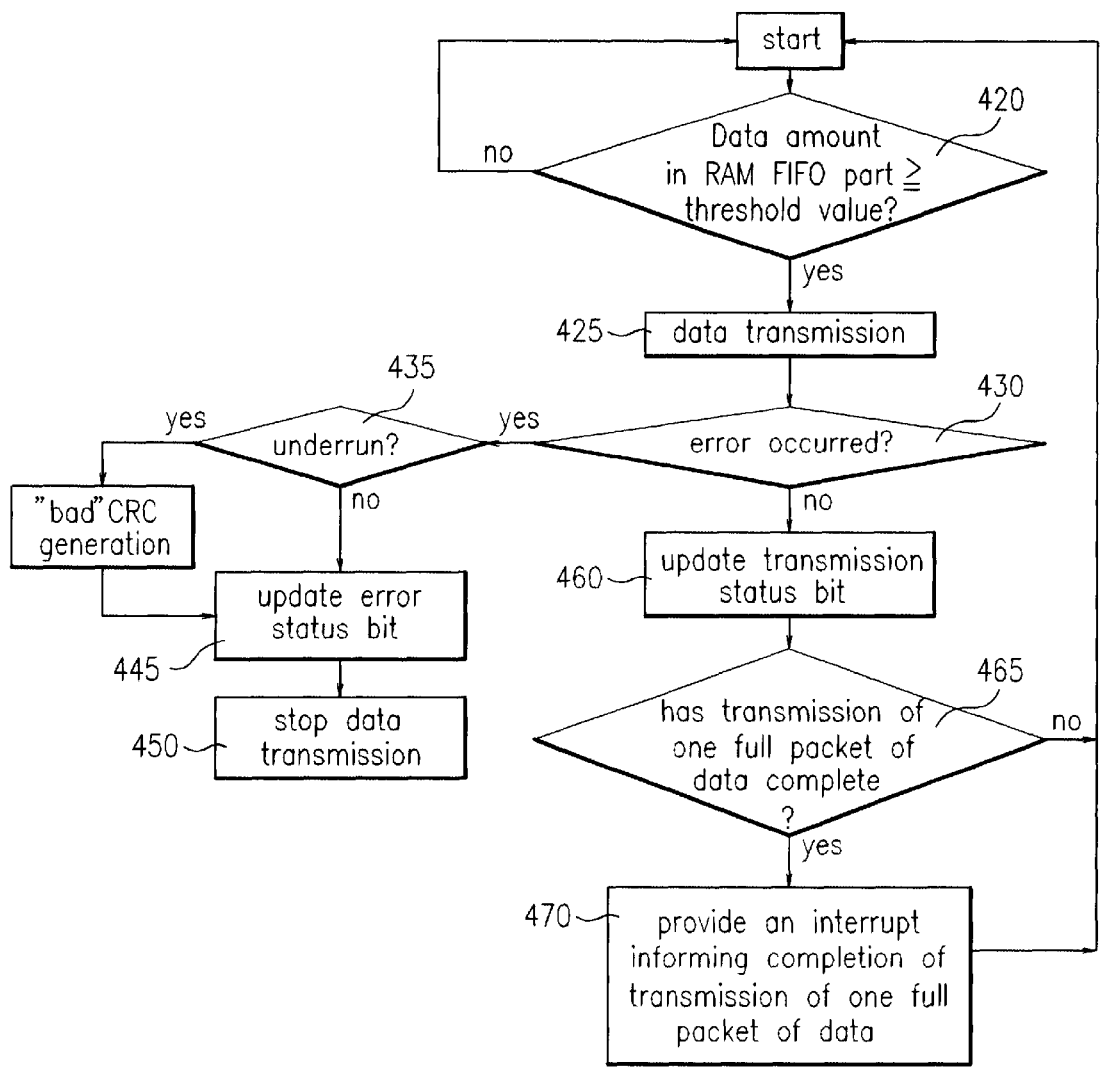
FIG. 2 illustrates a flow chart for explaining the steps of a method for controlling a related art PCI ethernet control device.
Figure 3:
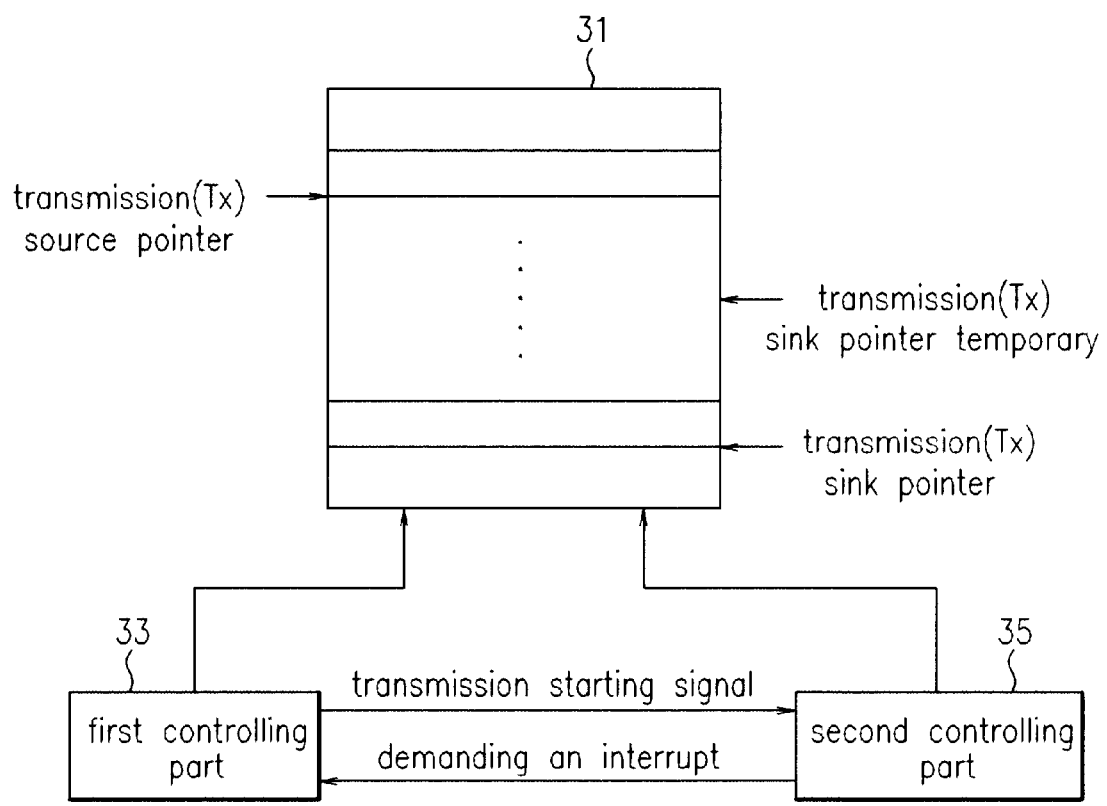
FIG. 3 illustrates a conceptual drawing of a device for controlling a PCI ethernet in accordance with a preferred embodiment of the present invention.

Reference will now be made in detail to the preferred embodiments of the present invention, examples of which are illustrated in the accompanying drawings. FIG. 3 illustrates a block diagram of a device for controlling a PCI ethernet in accordance with a preferred embodiment of the present invention.

Referring to FIG. 3, the device for controlling a PCI ethernet in accordance with a preferred embodiment of the present invention includes at large a RAM FIFO part 31, a first controlling part 33 and a second controlling part 35. The RAM FIFO part 31 has a size large enough to store one packet data and uses two-port RAMs as a system speed and a network speed are different. The first controlling part 33 transfers data to be transmitted from main memory of the system to the RAM FIFO part 31, compares an amount of data to be stored in the RAM FIFO part 31 to a transmission threshold value to provide a transmission start signal to the second controlling part 35 to read the data stored in the RAM FIFO part 31, and increases transmission source pointer in succession whenever data is stored in the RAM FIFO part 31. The second controlling part 35 reads the data stored in the RAM FIFO part 31 upon reception of the transmission start signal. In the data reading from the RAM FIFO part 31, a transmission temporary sink pointer is used. The transmission temporary sink pointer increases in succession whenever the data stored in the RAM FIFO part 31 is read, to mark reading of a data stored at a certain address.

The temporary sink pointer will be explained in more detail with reference to FIG. 4.

Figure 4:
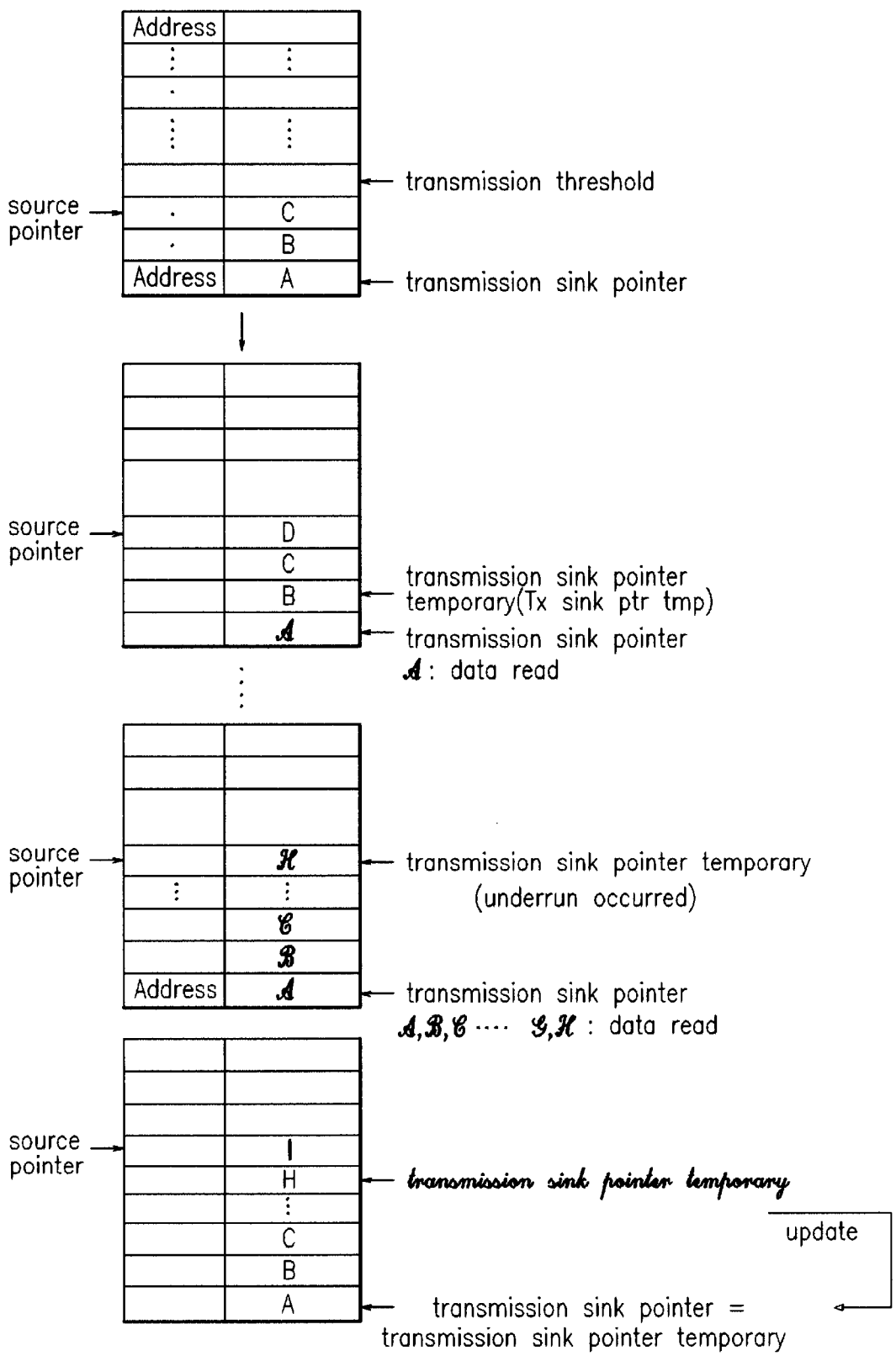
FIG. 4 illustrates conceptual drawings for explaining data input/output to/from the RAM FIFO part of the present invention; and, FIG. 5 illustrates a flow chart for explaining the steps of a method for controlling a PCI ethernet control device.

Referring to FIG. 4, the temporary sink pointer indicates an initial point of data storage. For example, if one packet has data from "A" to "K", the data is stored from the host computer to the RAM FIFO part 31 starting from "A" in succession. In this instance, the temporary sink pointer points to an address at which data storage begins, and the source pointer increases in succession whenever the data is stored in the RAM FIFO 31. If a transmission threshold value of the RAM FIFO part 31 has a value when a data of "D" is stored, at the moment when the data of "D" is stored in the RAM FIFO part 31, a data of "A" is read. In this instance, the temporary sink pointer is also increased in succession. If an underrun occurs in the middle of repeating such a process, for example, if an underrun occurs at the moment when a data of "G" is read and a data of "H" is stored in the RAM FIFO part 31, to allow the temporary sink pointer and the transmission source pointer to be matched, the first controlling part 33 stops the transmission source pointer and increases the transmission threshold value for preventing occurrence of the underrun again in advance. That is, because the probability of the underrun occurrence is greater when the threshold value is the smaller, the threshold value is increased once an underrun occurs. For example, in the present invention, the threshold value initially set at a time point when the data "D" is stored is increased to set it at a time point when the data "J" is stored in the RAM FIFO part 31. And, the second controlling part 35 updates the temporary sink pointer value with the sink pointer value. At the end, upon occurrence of an underrun or other error, the transmission sink pointer stores data starting from data before the one packet data to be transmitted and received at the main memory, i.e., stores starting from a data of "I" which could not be transferred from the host computer to the RAM FIFO part 31 due to occurrence of the underrun. And, when the data of "J" is stored in the RAM FIFO part 31 again, the source pointer increases in succession to an interrupt value when data "A" is read. The transmission temporary sink pointer updated with a sink pointer value increases from the beginning.

A method for controlling the PCI ethernet controlling device of the present invention will be explained with reference to FIG. 5. FIG. 5 illustrates a flow chart for explaining the steps of a method for controlling a PCI ethernet control device.

When a driver provides a signal indicating that data to be transmitted is ready to the first controlling part 33, the first controlling part 33 reads the data to be transmitted from the main memory and stores it in the RAM FIFO part 31 in succession. In this instance, the source pointer increases every time the data is stored in the RAM FIFO part 31 in succession. Then, the first controlling part 33 compares an amount of data stored in the RAM FIFO part 31 to a transmission threshold value(510), to provide a signal prompting the second controlling part 35 to read data in the RAM FIFO part 31 as well as continue to store data in the RAM FIFO part 31, if the amount of data is greater than the threshold value. Upon reception of the signal to read the data stored in the RAM FIFO part 31, from the first controlling part 33, the second controlling part 35 reads and transmits the data stored in the RAM FIFO part 31, with successive increase of the transmission temporary sink pointer whenever data is read from the RAM FIFO part 31(520). Occurrence of an error is determined while the data is being transmitted(530), and it is determined whether the error is an underrun(540), if an error occurs. If the error is found to be an underrun error as a result of the determination, the first controlling part 33 stops the increase of the transmission source pointer, and the second controlling part 35 returns the position of the transmission sink temporary pointer back to an initial position(i.e., a position of the transmission sink pointer)(550). In this instance, with regard to the present packet of data, the first controlling part 33 knows the extent of data stored in the RAM FIFO part 31 and the extent of data to be stored further in the RAM FIFO part 31, and provides a signal to the driver to store only the remaining data, excluding the data already stored in the RAM FIFO part 31 in the RAM FIFO part 31(560). So, in order to prevent occurrence of another underrun in advance, the transmission threshold value is increased. That is, because the probability of an underrun occurrence is higher when the threshold value is the smaller, if there is an occurrence of an underrun once, the threshold value is increased. If the error is found not to be an underrun error as the result of the determination, the second controlling part 35 returns the transmission temporary sink pointer back to the position of the transmission sink pointer(570). And, the first controlling part 33 signals the driver to provide data to be transmitted from the main memory(580) from the beginning of the packet and waits for the driver to prepare the data to be transmitted. Upon reception of a signal indicating the data to be transmitted is ready from the driver, the first controlling part 33 starts to transmit the data from the beginning of the packet. On the other hand, if no error is detected, a status bit of the data transmitted at the present time is updated (590) (i.e., the transmission temporary sink pointer is updated), and whether there has been a full transmission of one packet is determined(600). If it is found that a full transmission of one packet is not completed as a result of the determination, data transmission is continued until one packet is transmitted completely. And, if it is found that a full transmission of one packet is completed as a result of the determination, the position of the transmission temporary sink pointer is moved to the position of the transmission sink pointer, and an interrupt informing the driver that one packet is transmitted fully is provided(610). Thus, data can be transmitted by a packet unit from a host computer to each media.

The device and method for controlling a PCI ethernet have the following advantages.

Because the data is read, not from the beginning, but from the data remaining, excluding the data stored in the RAM FIFO part, a time period required for re-transmission of data is minimized in a case of an underrun occurrence in a data transmission.

It will be apparent to those skilled in the art that various modifications and variations can be made in the device and method for controlling a PCI ethernet of the present invention without departing from the spirit or scope of the invention. Thus, it is intended that the present invention cover the modifications and variations of this invention provided they come within the scope of the appended claims and their equivalents.

What is claimed is:

1. A device for controlling transmission of data between a host computer and various media, comprising:

a storing part for storing data transmitted from the host computer and providing the data in succession when an amount of the stored data becomes greater than a transmission threshold value;

a first controlling part for requesting the host computer to provide the remnant of data belonging to a data packet, excluding a portion of said data packet, said portion having been stored in the storing part, in response to an interruption in the reception of one full data packet; and a second controlling part for reading data in succession in response to a data start signal from the first controlling part and updating the position of a temporary sink pointer which marks the data read up to the occurrence of an underrun to a position in the storing part at which the data is stored.

2. A device as claimed in claim 1, wherein the storing part includes a RAM FIFO.

3. A device as claimed in claim 2, wherein the RAM FIFO includes a two-port RAM.

4. A device as claimed in claim 1, wherein the first controlling part controls a transmission source pointer which is increased in succession whenever data is stored from the host computer to the storing part.

5. A device as claimed in claim 1, wherein the first controlling part controls data storage in the storing part and compares the amount of stored data to the threshold value.

6. A device as claimed in claim 1, wherein the second controlling part updates a position of the temporary sink pointer to an initial position if one full packet of data has been transmitted.

7. A device as claimed in claim 1, wherein the temporary sink pointer is updated to an initial position of the sink pointer on occurrence of an underrun, for retaining data stored in the storing part before the occurrence of the underrun.

8. A method for controlling a PCI ethernet controlling device in data transmission between a host computer and various media, comprising the steps of:

storing data to be transmitted in a memory in succession until an amount of the data becomes greater than a threshold value;

retaining a portion of a packet of data stored in memory and storing the remnant of a packet of data in the memory starting from data not yet stored in memory, in the event that an underrun occurs in the middle of data transmission; and storing data in the memory again from beginning of the data if an error other than the underrun occurs; and determining completion of the transmission of one full packet of data if no error occurs.

9. A method as claimed in claim 8, wherein the memory includes a storing part.

10. A method as claimed in claim 8, further comprising the step of: continuing data transmission if it is determined that one full packet of data is not completely transmitted; and providing an interrupt indicating the transmission of one full packet of data if it is determined that one full packet of data has been transmitted.

11. A method for controlling a PCI ethernet controlling device in data transmission between a host computer and various media, comprising the steps of:

comparing an amount of data stored in a storing part to a transmission threshold value and transmitting the data stored in the storing part in succession if the amount of data is greater than the threshold value;

detecting the presence of an error during data transmission and determining whether the error is an underrun error;

updating a transmission temporary sink pointer and storing data starting from the remnant of a data packet, but excluding a portion of said data packet, said portion having been previously stored in the storing part as a result of the error having been found to be an underrun error, and updating the transmission temporary sink pointer; and storing the data in the storing part from the beginning if the error is found not to an underrun error;

determining completion of transmission of one full packet of data if no error is detected; and providing an interrupt indicating completion of transmission of one full packet of data if transmission of one full packet of data is completed, otherwise continuing data transmission until transmission of one full packet of data is completed.

12. A method as claimed in claim 11, wherein the temporary sink pointer is updated to a position in the storing part at which data transmitted from the host computer is stored for the first time.

13. A method as claimed in claim 10, wherein the temporary sink pointer is updated to a position in the storing part at which the data transmitted from the host computer is stored for the first time on an occurrence of an underrun, for retention of data stored in the storing part before the occurrence of the underrun.

* * * * *